Patented Apr. 10, 1934

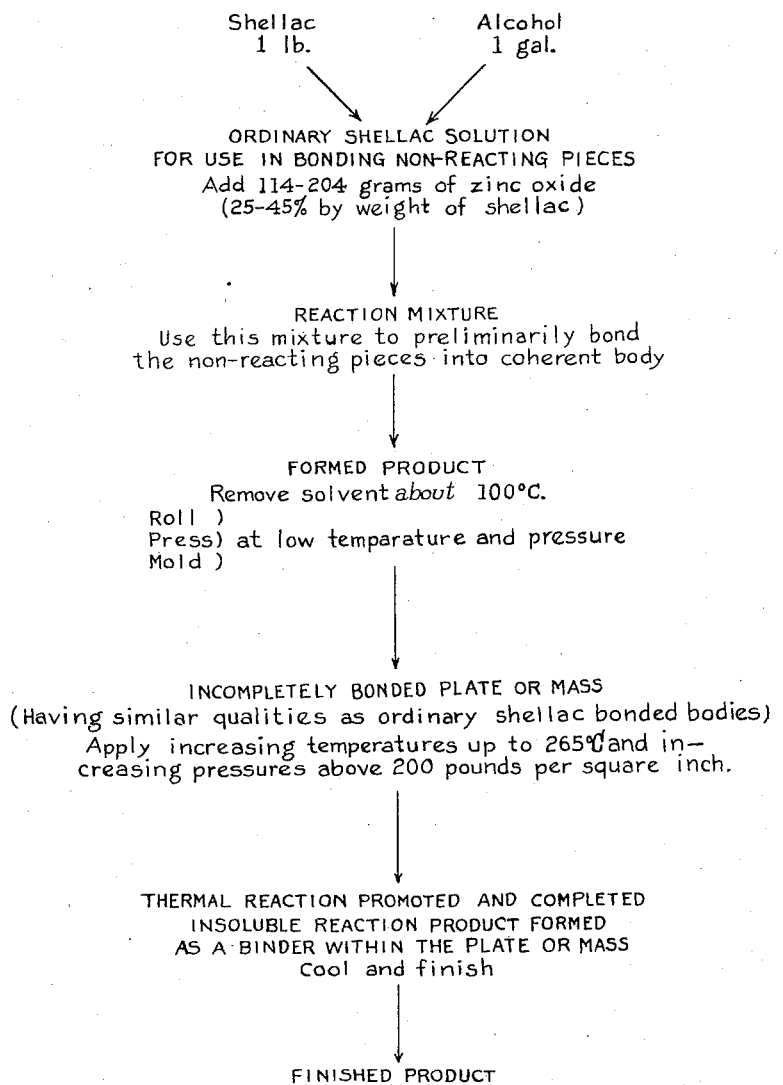

UNITED STATES PATENT OFFICE 1,953,950

COMPOSITE MICA ARTICLE, METHOD OF MAKING THE SAME AND CEMENTITIOUS BINDER

Willis A. Boughton, Cambridge, Mass., assignor to New England Mica Co., Waltham, Mass., a corporation of Massachusetts Application July 19, 1930, Serial No. 469,205

30 Claims. (Cl. 154—2.6)

My invention relates to the manufacture of composite mica articles and other non-reacting pieces, and includes within its scope not only composite mica in the form of a plate or other shape useful in the industrial arts together with an improved method of manufacture thereof, but also a new composition of matter functioning as a cementitious material or binder to cause effective coherence of the mica films or splittings used in building the plate or other article to the desired dimensions, and the method of effecting such binding action of the compound together with its value as affecting the characteristics of the coherent composite mica article so produced.

The object of my invention, broadly stated, is to produce composite mica bodies having many commercial advantages over composite mica bodies in which shellac alone is used as a binder. Plate and/or other commercial shapes formed by practising the teaching of my invention as herein disclosed have the advantages of (1) higher dielectric strength, (2) a diminished tendency for the binder to ooze under elevated temperature conditions, (3) increased resilience, (4) greater toughness, (5) being more resistant to the action of solvents, and, in addition, an important advantage is gained when punching segments or the like from my plates in that sharper edges are obtained.

The accompanying plot or diagram indicates the various steps employed in forming a binder from my novel reaction mixture and in bonding non-reacting pieces therewith to produce a finished product useful as insulation and in other environments subject to excessive heat.

The method of making mica plate by bonding together several layers of mica films or splittings is well known in this art. The binder, most usually, is an organic adhesive such as shellac, although other binders are known and used in the manufacture of mica plate for special purposes. As will be understood from the following description I follow the known process, generally, but with important variation because of the novel characteristics of the compound which I use for cementitious material.

My improved cementitious material is preferably produced by the thermal reaction upon shellac of an insoluble basic inorganic material, zinc oxide having been found to give highly satisfactory results. A cementitious material comprising this reaction product has been found to impart the above-mentioned superior characteristics to the composite mica article, while only unsatisfactory results, i. e. articles of poorer qualities, have been obtained from a binder compound produced by the reaction upon shellac of other metal oxides.

In my process I utilize a resin, such as shellac, as a base in the production of the cementitious material, this being initially dissolved in alcohol. Shellac contains an acid or acids capable of thermal reaction with an insoluble basic inorganic material such as zinc oxide. The shellac is used without previous neutralization of its acid component or components with alkali (e. g. soda). I prefer first to form a dilute or concentrated solution of shellac, in a suitable organic solvent such as ethyl alcohol (for example in the proportions of about one pound of dry shellac to the gallon of solvent) and to this solution I add the desired amount of the insoluble basic inorganic material, preferably powdered zinc oxide.

The most favorable results have been obtained utilizing shellac and zinc oxide with the proportion of zinc oxide approximating 5% of the shellac solution, and limits of from 4 to 8% of zinc oxide are recommended. Thus, I preferably use 25 to 45% (and still better between 30 and 40%) of zinc oxide, say 35% (preferably over one-third) based on the weight of the dry shellac.

A particularly satisfactory formula is

Shellac_____ 454 grams (about 1 pound)
Zinc oxide_____ 175 grams
Alcohol (ethyl) -to make 1 gallon (about 3700 cc.)

When a basic inorganic material is added to a shellac solution a preliminary slight chemical reaction takes place immediately, the color changing from the characteristic brown to some other color characteristic of the compound added. For zinc oxide this color is a light brownish pink, and immediately thereafter the mixture is ready to be utilized in the production of a binder for cementing together the mica splittings or films to form therefrom a coherent composite mica article. It will be understood from the following description that at this stage the special thermal reaction has not commenced.

In the manufacture of the plate the constituent layers of mica films are sprinkled with the mixture as the plate is built up, or the films, laid as for a complete plate, are immersed in the mixture under conditions which permit penetration between the films and flow to all parts of the plate, either by gravity or capillarity, so that the interstices are filled. The process of penetration between the films is so conducted as to avoid any considerable disturbance of their relative position. The resulting sheet is then squeezed, as by roller pressure, to compact the layers of films and to remove any excess of the liquid mixture. The plate is dried under the relatively low temperature and pressure used in the manufacture of mica plate with shellac binder.

At this stage the plate is only partially completed, because, even though the mica films are held together sufficiently to enable the structure to be handled as a plate still the full effect of my new compound as a binding agent has not been realized. I secure this full effect by heating the plate to higher temperatures and under greater pressures than heretofore used thus causing the thermal reaction, commenced in the first stage of heating, to become completed between the shellac and the zinc oxide while the reaction mixture is within the plate, or between and about the mica films thereof. This step of the process I call the hot pressing operation and I employ a much higher degree of heat and pressure than generally has been used heretofore in the production of composite mica bodies of the kind contemplated by my present invention. To bring about this thermal reaction as completely as possible and because of the fact that my binder compound produced by the thermal reaction between zinc oxide and the acids of shellac is much more heat-resistant than shellac itself, it is possible and desirable to carry the temperature during the hot pressing operation very much above that used in ordinary practice when shellac alone is used as the binder. In fact higher temperatures and pressures improve the desirable qualities of my thermally formed binder, affording a more resilient, tougher plate than heretofore obtainable with shellac alone as the binder.

The partially completed plate is pressed at 200 lbs. and above per square inch, while the faces of the press are heated above 100° C. preferably within a temperature range of 125-265° C. or higher. These figures of course are given merely by way of example, and any other effective method for bringing about the thermal reaction may be used without departing from the spirit or scope of my invention which is based upon the use of a special, novel reaction mixture for producing my binder compound.

It will be noted that the process thus involves several stages. First, the mica films are assembled and held together temporarily in plate form by the alcoholic solution-suspension of shellac to which zinc oxide has been added. Second, the said solution is dried out, while this roughly formed plate is heated somewhat, say to 100° C. to form a plate in which the binder reaction materials are solvent free, but this temperature is not high enough to effect the thermal reaction. Third, the plate, while preferably under a higher pressure than in the said second stage, is heated to a markedly higher temperature, say to 165 to 265° C., which completes the reaction between the shellac and the zinc oxide, whereby the composition becomes harder, tougher and more insoluble, and a stronger plate than heretofore has been attained is produced.

In the final hot pressing operation, as heretofore stated, I recommend a temperature of 200° C., or above, and a minimum pressure of 250 to 300 lbs. per square inch. With temperatures much over 200° C., I preferably use pressures, in the final hot pressing treatment, well over the minimum. This brings about the completion of the thermal reaction between the shellac and the zinc oxide, raises the decomposition temperature of the binder thus produced, improves its other important properties and produces a tougher plate in which the binder is less apt to ooze at the temperatures at which it is to be used. In explanation of this it should be borne in mind that at the highest temperatures (say above 200° C.) my completely reacted binder is or may be fluid. If, therefore, the finished plate is to be used at temperatures below, say, 200° C., no oozing of the binder will take place; if above 200° C. some oozing may occur.

My process is essentially a thermal one; that is, the reaction takes place, or at any event is largely completed only as the result of the application of a definite notable amount of heat at temperatures above the boiling point of water and in the absence of water and ordinary shellac solvent. Temperatures, in the hot pressing, above 125° C., and preferably in the vicinity of 200° C., are necessary to produce completion of the reactions. That some reaction may occur between the shellac in alcoholic solution and zinc oxide when these two are mixed cold is admitted, but the reaction is slight and very incomplete for the reasons that (1) zinc oxide is almost wholly insoluble in alcohol; (2) the solution although somewhat changed in color, precipitates only shellac and a trace of zinc oxide when diluted with water; and (3) the marked and desired change in properties does not take place until after the solvent is evaporated and the stated greater heat is applied to the resulting intimate mixture of shellac and zinc oxide. It is in these final stages of heating, and not in solution, that the essential reactions of my process take place.

I call particular attention to the following important advantages inherent in the plates made by my present process, as compared with plates made with a binder of untreated shellac according to the teaching of the prior art.

| Plates bonded by | Dielectric strength | Oozing point as determined |
| --- | --- | --- |
| Shellac | 750 | 163° C. |
| My zinc compound | 1050 | 196° C. |

My zinc compound is resistant to alcohol (ethyl and denatured) for many hours, whereas the ordinary shellac bonded plate will fall to pieces in a short time when immersed in alcohol.

For the purpose of comparison, I give the following characteristics and distinguishing properties in comparing four particular substances as follows:

A. Untreated shellac,
B. The zinc oxide compound of shellac prepared in accordance with my invention,
C. The lead acetate compound of shellac prepared in accordance with the teaching of Simonson-Blair in U. S. Patent No. 1,309,967,
D. The shellac zinc acetate compound prepared in accordance with the Simonson-Blair method (substituting an equimolecular amount of zinc acetate for the lead acetate of said patent).

*Solubilities of substances*

| Solvent | A | B | C | D |
| --- | --- | --- | --- | --- |
| Alcohol | Sol. | Insol. | Sl. sol. | Sol. |
| Methyl alcohol | Sol. | Insol. | Insol. | Part. sol. |
| Acetone | Sol. | Insol. | Sl. sol. | Sol. |
| Ether | Sol. | Insol. | Insol. | Insol. |
| Benzol | Sl. sol. | Insol. | Insol. | Insol. |
| Amyl acetate | Sl. sol. | Insol. | Insol. | Insol. |

*Hardness.*—Chips broken from the mass of each after fusion and cooling when tested for relative hardness by scratching against one another (this being a common procedure in testing the relative hardness of minerals and other substances) showed:

Pure shellac scratched zinc product D, but did not scratch my zinc compound B. The zinc product D did not scratch pure shellac A, and the scratching edge of D was broken on my zinc compound B. My zinc compound B scratched both shellac A and zinc product D.

This proves two points: (1) Simonson-Blair's process (using zinc acetate) does not appear to indurate shellac in the ordinary sense of the word, but rather seems to lower its hardness; and (2) my process does produce such an induration to a noticeable degree.

*Toughness.*—Other chips of the three materials made as described in the hardness tests above, when roughly tested for toughness by trying their relative friability, show:

Both products C and D (lead acetate shellac product and zinc acetate shellac product) are extremely friable and can be easily powdered. My zinc compound B is quite obviously tougher (less friable) than either shellac or the products made therefrom by the lead acetate or zinc acetate processes, and my zinc compound can be powdered only with markedly greater difficulty.

*Action under heat.*—Simonson-Blair's zinc product D prepared according to that method, dried, softens at 68–70° C. The color changes to dark brown. At 160° C. boiling or gas evolution commences. Spongification begins at 140° C., however, and increases as the temperature rises until at 200° C. the mass becomes spongy and crumbly, carbonization having obviously commenced, and loses its gum property of adhesion. Cooling and reheating do not affect the refusion temperature greatly.

Shellac alone A (finely ground button lac) softens at 50–70° C. The melting and boiling are spread over a wider range of temperature. At 200° C. it is very dark, almost completely spongy, and without adhesion. When cooled and reheated the mass softened at 60–70° C. melted below 130° C., commenced to become spongy below 200° C., with thermal decomposition and evolution of fumes, and at 220° C. was considerably decomposed, as indicated by black color, yielding a powdery brittle carbonaceous material when cold.

My zinc compound B softened at 65° C. (due to the presence of unreacted shellac) commenced to efferversce at 190° C., but was otherwise unchanged at 200° C. When cooled and reheated it softened at 130° C., melted at 150° C. and did not decompose at 205° C. After a second cooling it was heated again when it was found to soften at 170° C. A final cooling and reheating did not bring about a softening up to 200° C. After this treatment it still retained its adhesiveness.

It is important to note that of the three, my zinc compound alone retains the necessary original adhesive gum-like properties at 200° C. and higher temperatures. Other tests have shown that my zinc compound can be made to resist final thermal decomposition at the high temperature of 320° C., yielding a brownish but still resin-like adhesive material. At this temperature both shellac and Simonson-Blair's zinc acetate shellac products are so charred as to be worthless. In other words, my zinc compound has attained a far greater degree of infusibility and resistance to thermal decomposition than any apparently similar product of which I am aware.

Exhaustive experiments indicate that thermal reaction under the conditions herein described takes place between shellac and many kinds of metal oxides and in the case of zinc, with all zinc salts tried. But the usefulness of the reaction products as mica binders varies widely. Some reacting metal compounds, for example, chromic oxide and zinc borate, yield products that are spongy and useless as binders. Others, for example, lead, cadmium and magnesium oxides, afford compounds that will stick mica pieces together but are so brittle that the resulting plate is as fragile as a thin film of ice. It is improbable that any of the compounds thus far obtained, except that from shellac and zinc oxide, could be successfully used as mica binders. I believe that the reason for this is that the mixed zinc salts of the shellac acids as produced thermally have the most advantageous properties for this purpose of all metal salts; and when zinc oxide is used these properties are not masked or destroyed by interfering acid radicals afforded when salts such as borate or sulfide are used, or by evolution of excess of gases or decomposition ($H_2O$, $CO_2$, etc.). It may further be stated that ordinary shellac binder chars at above 150° C. and becomes a rubbery charred mass, disintegrating the mica plate.

A sharp distinction should be drawn between any reaction, or partial reaction, taking place in solution either aqueous or organic, and that proceeding when molten shellac reacts with a metal oxide. The former is identified with prior known processes and the latter constitutes the essential feature of my invention.

Finally I call attention to a fundamental difference between the zinc oxide compound and process of making mica plate therewith—and when ordinary shellac, or other resin is used, or even when synthetic resins of various descriptions are used. In the latter processes the binding material as a chemically finished product is dissolved in a solvent, the mixture used to cement mica pieces together, the solvent evaporated, and heat and pressure applied to produce the desired uniformity of adhesive and distribution of the molten or plastic binder. On the other hand, with the zinc oxide compound and process the reaction forming the novel binder of superior qualities is necessarily brought about in the plate after the latter has been integrated and the solvent removed. My zinc compound cannot because of its great insolubility be first made as a resin then powdered, dissolved and the solvent used as a binder. No solvent has as yet been found for the product of complete thermal reaction between zinc oxide and shellac.

This application is in part a continuation of my co-pending applications Serial Nos. 245,273 and 245,274 filed January 7, 1928.

While my new compound for producing cementitious material has herein been explained particularly with reference to its value as a binder in the manufacture of composite mica bodies, those skilled in the art will understand that it has other uses within the scope of the appended claims.

The nature and scope of my invention having been indicated, and having thus described modes of practising my novel method when employing its underlying principle yet recognizing that modifications may be made without departing from its spirit and scope, what is claimed as new, is:

1. The method of cementing non-reacting pieces to produce built-up products, which comprises preliminarily bonding said pieces with a reaction mixture comprising a shellac solution and basic inorganic material, removing the solvent and pressing said pieces into a coherent body at moderate temperatures and pressures, then applying a pressure above 200 pounds per square inch within a temperature range of from 125° C. to 265° C. and promoting and completing a thermal reaction between said shellac and basic inorganic material and forming in situ between the surfaces of the pressed pieces by said thermal reaction an insoluble reaction binder product having a higher decomposition temperature than shellac, and bonding said non-reaction pieces thereby while under pressure.

2. The invention according to claim 1 in which the applied temperature range is from 200° C. upwards.

3. The method of cementing non-reacting pieces to produce built-up products, which comprises preliminarily bonding said pieces with a reaction mixture comprising a shellac solution and anhydrous zinc oxide, removing the solvent and pressing said pieces into a coherent body at moderate temperatures and pressures, then applying a pressure above 200 pounds per square inch within a temperature range of from 125° C. to 265° C. and promoting and completing a thermal reaction between said shellac and zinc oxide and forming in situ between the surfaces of the pressed pieces by said thermal reaction an insoluble reaction binder product having a higher decomposition temperature than shellac, and bonding said non-reacting pieces thereby while under pressure.

4. The method of cementing non-reacting pieces to produce built-up products, which comprises preliminarily bonding said pieces with a reaction mixture comprising a shellac solution and anhydrous zinc oxide in the proportion of from 25 percent to 45 percent by weight of the shellac removing the solvent and pressing said pieces into a coherent body at moderate temperatures and pressures, then applying a pressure above 200 pounds per square inch within a temperature range of from 125° C. to 265° C. and promoting and completing a thermal reaction between said shellac and zinc oxide and forming in situ between the surfaces of the pressed pieces by said thermal reaction an insoluble reaction binder product having a higher decomposition temperature than shellac, and bonding said non-reacting pieces thereby while under pressure.

5. The method of cementing mica flakes to produce built-up mica products, which comprises applying a mixture consisting of a solution of shellac containing suspended substantially anhydrous basic inorganic material between the surfaces of said mica flakes, evaporating the solvent of said shellac, applying a pressure of above 200 pounds per square inch to raise the decomposition temperature of the resulting cementitious compound, and also a temperature range of from 125° C. to 265° C. to said mica flakes and mixture, effecting a thermo-chemical reaction in situ between said shellac and basic inorganic material at said temperature and pressure, and producing an insoluble inorganic-material-shellac compound having a higher decomposition temperature than shellac, and bonding said mica flakes under said pressure by said compound.

6. The invention according to claim 5, in which the applied pressure is from 250 to 300 pounds per square inch, and the accompanying temperature range is from 200° C. upward.

7. The method of cementing mica flakes to produce built-up mica products, which comprises applying a mixture consisting of a solution of shellac containing suspended substantially anhydrous zinc oxide, between the surfaces of said mica flakes, evaporating the solvent of said shellac, applying a pressure of 200 pounds and upward per square inch to raise the decomposition temperature of the resulting cementitious compound, and a temperature range of from 125° C. to 265° C. to said mica flakes and mixture, effecting a thermo-chemical reaction in situ between said shellac and zinc oxide at said temperature and pressure, and producing an insoluble zinc-shellac compound having a higher decomposition temperature than shellac, and bonding said mica flakes under said pressure by said zinc-shellac compound.

8. The invention according to claim 7 in which the applied pressure range is from 250 to 300 pounds per square inch, and the accompanying temperature range is from 200° C. upward.

9. The method of cementing mica flakes to produce built-up mica products, which comprises applying a mixture consisting of a solution of shellac containing from 25 percent to 45 percent of suspended, anhydrous zinc oxide of the weight of the dry shellac between the surfaces of said mica flakes, evaporating the solvent of said shellac, applying a pressure of above 200 pounds per square inch to raise the decomposition temperature of the resulting cementitious compound, and also a temperature range of from 125° C. to 265° C. to said mica flakes and mixture, effecting a thermo-chemical reaction in situ between said shellac and zinc oxide at said temperature and pressure and producing an insoluble zinc-shellac compound having a higher decomposition temperature than shellac, and bonding said mica flakes under said pressure by said compound.

10. The invention according to claim 9, in which the applied pressure range is from 250 to 300 pounds per square inch, and a temperature range is from 250° C. upward.

11. The invention according to claim 9 in which the zinc oxide is present in about 35 percent by weight of the shellac, and the applied temperature is from 200° C. upward.

12. The process of cementing mica flakes which comprises treating shellac and solvent with anhydrous zinc oxide in order to effect a reaction with the free resin acids present when fused and solvent free, bonding mica flakes with the shellac zinc oxide mixture, evaporating the solvent, and subjecting the resulting product to a temperature of not less than 125° C. and pressure to effect said reaction and produce a fused binder, and bonding said mica flakes by said binder.

13. The process which comprises the step of heating and pressing a composite layer containing mica flakes and a shellac-anhydrous zinc oxide mixture at a temperature of not less than 125° C. to promote and complete the reaction between the shellac and zinc oxide and form a binder which has a higher softening point than shellac.

14. The process which comprises the step of heating and pressing a composite mass of non-reacting material and a mixture of shellac and anhydrous zinc oxide at a temperature above 200° C. to effect a thermo-chemical reaction between the zinc oxide and the shellac and a pressure greater than 200 pounds per square inch to produce a binder having a softening point above 165° C., and bonding said non-reacting material by said binder.

15. The process which comprises the step of heating and pressing a composite layer containing mica flakes and a shellac-anhydrous zinc oxide mixture under a temperature of not less than 125° C. and a pressure greater than 200 pounds per square inch to form an alcohol-insoluble binder having a higher softening point than shellac, and bonding said mica flakes by said binder.

16. A bonded product formed of a mass of non-reacting pieces having as a binder the alcohol-insoluble reaction product of shellac and an anhydrous basic inorganic material, said reaction product being produced under a pressure of from 200 pounds per square inch and upward, and at a temperature of 200° C. and upward.

17. A bonded product formed of a mass of non-reacting pieces having as a binder the alcohol-insoluble reaction product of shellac and an anhydrous basic zinc compound, said reaction product being produced under a pressure of from 200 pounds per square inch and upward, and at a temperature of 200° C. and upward.

18. A bonded product consisting of non-reacting pieces bonded by a locally thermo-chemically produced zinc-shellac compound, said compound having a higher melting point than shellac, and a decomposition temperature above 200° C.

19. A composition of matter for use as a binder in the manufacture of composite mica articles comprising the incomplete reaction product of shellac and anhydrous zinc oxide in the proportion of between 25 percent and 45 percent by weight of the shellac, said reaction being produced in situ between the mica flakes under a pressure of 200 pounds per square inch and upwards, and at a temperature of 200° C. and upward.

20. A binder of the character specified in claim 19 in which the zinc oxide in the mixture is in the proportion of approximately 35 percent by weight of the shellac, said binder being produced under a pressure of from 200 pounds per square inch and upward, and at a temperature of 200° C. and upward.

21. A composition of matter of the character specified in claim 19, in which the zinc oxide in the mixture is in the proportion of approximately 35 percent by weight of the shellac, said binder being produced under a pressure of from 200 pounds per square inch and upward, and at a temperature of 200° C. and upward.

22. A bonded mica product consisting of mica flakes bonded by a locally thermo-chemically produced anhydrous-zinc-oxide-shellac-compound at a temperature of at least 125° C., said compound having a higher melting point than shellac, and a decomposition temperature of above 200° C.

23. A cementitious product in a composite mica article, formed by a thermo-chemical reaction between shellac and an insoluble anhydrous basic zinc compound at a temperature of at least 125° C., such cementitious product having the property of resisting heat up to over 200° C. without substantial disintegration or charring or loss of its function in the composite mica article.

24. A cementitious material for use in the manufacture of composite mica articles consisting of the reaction product of unneutralized shellac in alcoholic solution and water-free zinc oxide in the proportion of between 4 and 8% of the shellac solution, said product obtained by heating the components to a temperature of at least 125° C.

25. A cementitious material for use in the manufacture of composite mica articles consisting of the reaction product of unneutralized shellac in solution and water-free zinc oxide, said product obtained by heating the components to a temperature of at least 125° C.

26. A cementitious material for use in the manufacture of composite mica articles consisting of the reaction product of unneutralized resinous material of the type having acidic radicals and water-free zinc oxide, said product obtained by heating the components to a temperature of at least 125° C.

27. A composite mica article comprising flakes of mica bonded together by the herein described reaction product of unneutralized resinous material of acid character and water-free zinc oxide, said product obtained by heating the components to a temperature of at least 125° C.

28. A composite mica article comprising flakes of mica bonded together by the herein described reaction product of unneutralized shellac and water-free zinc oxide, said product obtained by heating the components to a temperature of at least 125° C.

29. A composite mica product consisting of superimposed layers of mica flakes cemented together under heat and pressure by a composition consisting of combined unneutralized resin and water-free zinc oxide, said composition obtained by heating the components to a temperature of at least 125° C.

30. A composite mica product consisting of superimposed layers of mica flakes cemented together under heat and pressure by a composition consisting of combined unneutralized shellac and water-free zinc oxide, said composition obtained by heating the components to a temperature of at least 125° C.

WILLIS A. BOUGHTON.